US010369590B2

(12) United States Patent
Seferi

(10) Patent No.: US 10,369,590 B2
(45) Date of Patent: Aug. 6, 2019

(54) GLUE GUN

(71) Applicant: Acme United Corporation, Fairfield, CT (US)

(72) Inventor: Nicholas L. Seferi, Southbury, CT (US)

(73) Assignee: Acme United Corporation, Fairfield, CT (US)

(*) Notice: Subject to any disclaimer, the term of this patent is extended or adjusted under 35 U.S.C. 154(b) by 0 days.

(21) Appl. No.: 15/435,713

(22) Filed: Feb. 17, 2017

(65) Prior Publication Data
US 2017/0259295 A1  Sep. 14, 2017

Related U.S. Application Data

(60) Provisional application No. 62/306,292, filed on Mar. 10, 2016.

(51) Int. Cl.
*B05C 17/005* (2006.01)
*G01K 11/12* (2006.01)

(52) U.S. Cl.
CPC .... *B05C 17/0053* (2013.01); *B05C 17/00546* (2013.01); *B05C 17/00503* (2013.01); *G01K 11/12* (2013.01)

(58) Field of Classification Search
CPC .......... B05C 17/0053; B05C 17/00546; B05C 17/00503; G01K 11/12
See application file for complete search history.

(56) References Cited

U.S. PATENT DOCUMENTS

| | | | |
|---|---|---|---|
| 4,535,916 A * | 8/1985 | Macherle | B05C 17/0055 126/414 |
| 4,776,490 A * | 10/1988 | Wingert | B05C 17/0053 222/146.5 |
| D315,283 S | 3/1991 | De Carolis et al. | |
| D316,215 S | 4/1991 | Belanger | |
| 5,215,230 A * | 6/1993 | Lee | B05C 17/0053 222/146.2 |
| 5,479,914 A * | 1/1996 | Tsai | B05C 17/0053 126/401 |
| 5,622,159 A * | 4/1997 | Liu | F41B 11/89 124/64 |
| 5,692,642 A * | 12/1997 | Brattesani | B05C 17/01 221/199 |
| D398,204 S | 9/1998 | Lee | |
| D399,719 S | 10/1998 | Mignanelli | |
| D402,518 S | 12/1998 | Lee | |
| D404,622 S | 1/1999 | Singleton | |
| D406,992 S | 3/1999 | Cheng | |
| 5,876,502 A | 3/1999 | Sugimura et al. | |

(Continued)

FOREIGN PATENT DOCUMENTS

| | | |
|---|---|---|
| DE | 000008228634 | 5/1983 |
| DE | 000069814914 | 3/2004 |

(Continued)

*Primary Examiner* — Frederick C Nicolas
(74) *Attorney, Agent, or Firm* — Alix, Yale & Ristas, LLP

(57) ABSTRACT

A glue gun is adapted to receive a glue stick and to feed the glue stick forwardly a heater subassembly. A trigger is sequentially operated to advance the glue stick. The heater assembly transforms the glue stick into molten glue which is dispensed through a frontal nozzle of the glue gun. The glue gun has a temperature indicator. The glue gun is exteriorly ergonomically configured for facile usage.

31 Claims, 19 Drawing Sheets

(56) References Cited

U.S. PATENT DOCUMENTS

| | | |
|---|---|---|
| 5,881,912 A | 3/1999 | Bokros |
| 5,881,923 A | 3/1999 | Bokros |
| 5,881,924 A | 3/1999 | Bokros |
| 5,895,159 A | 4/1999 | Liou |
| 5,901,881 A | 5/1999 | Wang |
| D412,432 S | 8/1999 | Bokros |
| D412,650 S | 8/1999 | Bokros |
| D414,663 S | 10/1999 | Bokros |
| 5,984,246 A | 11/1999 | Gardner |
| 5,988,445 A | 11/1999 | Massena |
| 6,041,972 A * | 3/2000 | Maayeh ............... B05C 17/0053 219/247 |
| 6,056,165 A | 5/2000 | Speranza |
| 6,065,888 A | 5/2000 | Maayeh |
| 6,066,689 A | 5/2000 | Columbus et al. |
| 6,105,324 A | 8/2000 | Singleton |
| 6,119,681 A * | 9/2000 | Lilke ................... B05C 17/0053 126/401 |
| D433,301 S | 11/2000 | Pack |
| 6,170,709 B1 * | 1/2001 | Huang ............... B05C 17/00523 222/146.5 |
| 6,202,892 B1 | 3/2001 | Lasko |
| 6,268,413 B1 | 7/2001 | Columbus et al. |
| D455,620 S | 4/2002 | Lee |
| 6,412,667 B1 | 7/2002 | Huang |
| 6,457,889 B1 | 10/2002 | Lin |
| D469,670 S | 2/2003 | Belanger |
| D474,949 S | 5/2003 | Schaffeld et al. |
| 6,558,059 B1 | 5/2003 | Hillinger et al. |
| 6,652,175 B2 | 11/2003 | Chang |
| 6,747,251 B1 | 6/2004 | Belanger |
| 6,766,923 B1 | 7/2004 | Huang |
| D496,239 S | 9/2004 | Levine et al. |
| 6,820,768 B2 | 11/2004 | Belanger |
| D505,845 S | 6/2005 | Lin et al. |
| D510,243 S | 10/2005 | Lee |
| D511,077 S | 11/2005 | Huang |
| D514,406 S | 2/2006 | Lee |
| D514,408 S | 2/2006 | Melendy et al. |
| D517,880 S | 3/2006 | Melendy et al. |
| D535,167 S | 1/2007 | Monfeli et al. |
| D554,960 S | 11/2007 | Deal et al. |
| D557,605 S | 12/2007 | Reber, II et al. |
| D576,458 S | 9/2008 | Arns |
| D590,674 S | 4/2009 | Belanger |
| 7,520,408 B1 | 4/2009 | Smith et al. |
| 7,776,173 B2 | 8/2010 | Schumacher et al. |
| D671,385 S | 11/2012 | Yung-Kuan |
| D714,866 S | 10/2014 | Heipp et al. |
| D719,038 S | 12/2014 | Heipp et al. |
| D724,400 S | 3/2015 | Filian et al. |
| D744,305 S | 12/2015 | Huang |
| D748,444 S | 2/2016 | Huang |
| 2002/0192005 A1 | 12/2002 | Chang |
| 2003/0205566 A1 * | 11/2003 | Evanyk ............... B05C 17/0053 219/221 |
| 2004/0060665 A1 * | 4/2004 | Richardot ......... B05C 17/00546 156/578 |
| 2004/0232165 A1 | 11/2004 | Lee |
| 2006/0081650 A1 * | 4/2006 | Axinte ............. B05C 17/00526 222/146.2 |
| 2006/0196888 A1 | 9/2006 | Agronin et al. |
| 2008/0197155 A1 | 8/2008 | Liang |
| 2008/0223511 A1 | 9/2008 | Schumacher et al. |
| 2011/0056994 A1 | 3/2011 | Yen |
| 2015/0209820 A1 | 7/2015 | Ono |
| 2017/0320089 A1 * | 11/2017 | Seferi ............... B05C 17/00503 |

FOREIGN PATENT DOCUMENTS

| | | |
|---|---|---|
| DE | 102006059305 | 6/2008 |
| DE | 102007008722 | 8/2008 |
| DE | 202013007889 | 11/2014 |
| DE | 202015002318 | 6/2015 |
| DE | 202015006480 | 11/2015 |
| DE | 102014105157 | 9/2017 |
| DE | 102017003063 | 10/2017 |

* cited by examiner

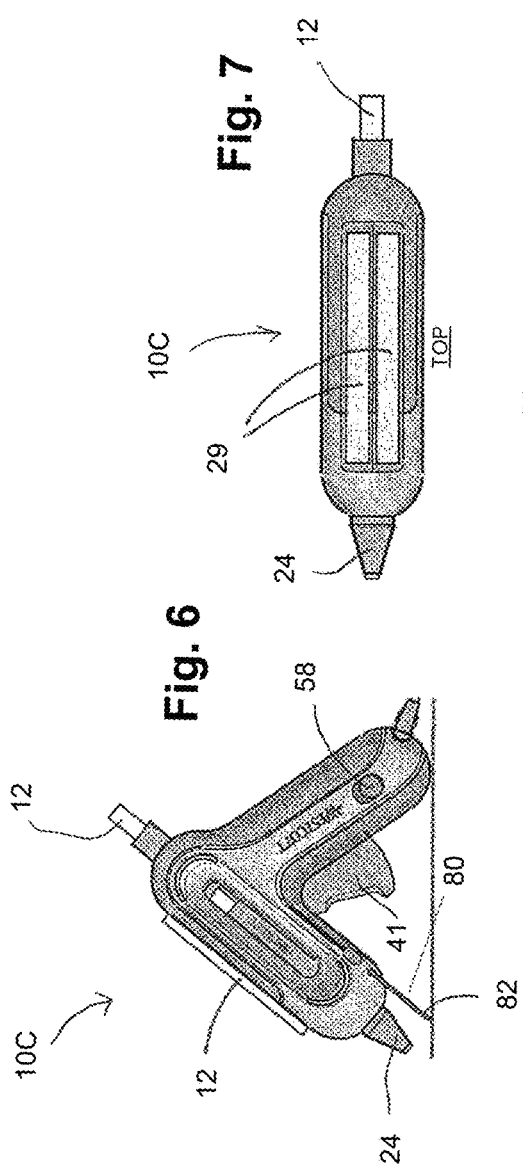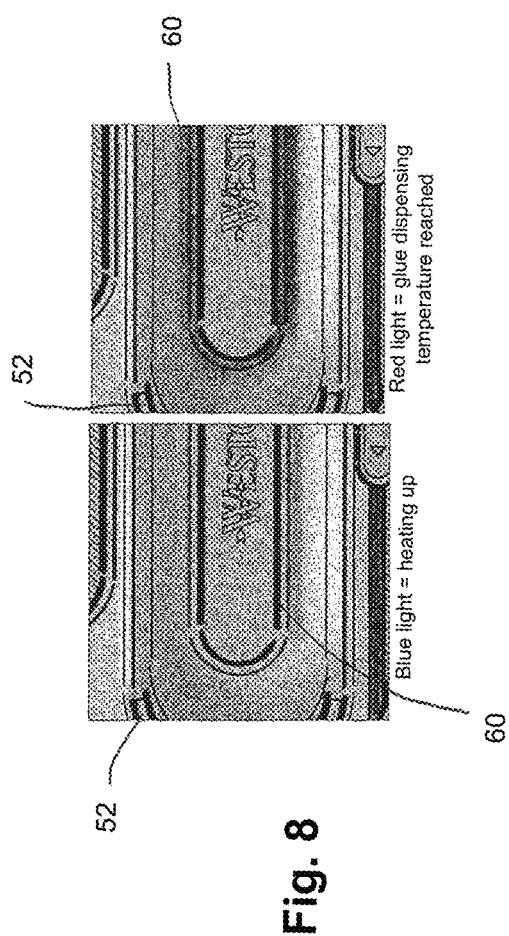

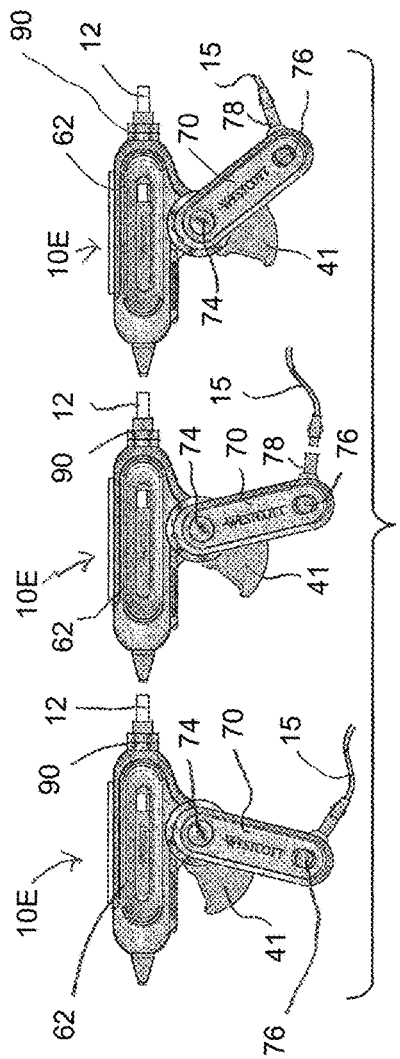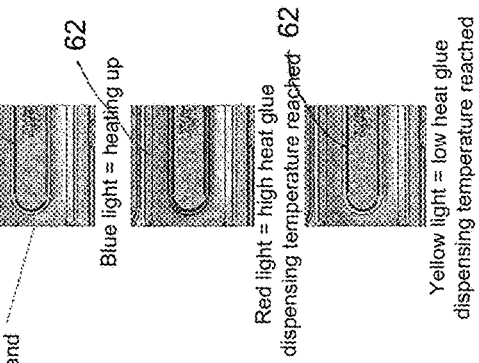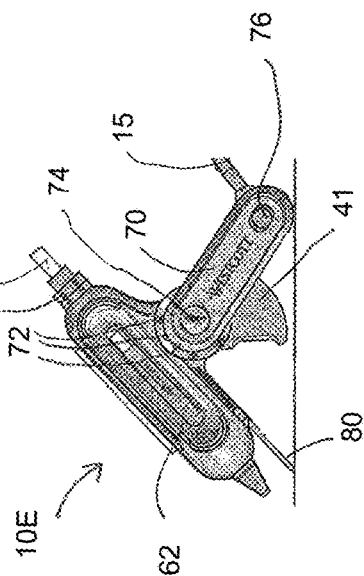

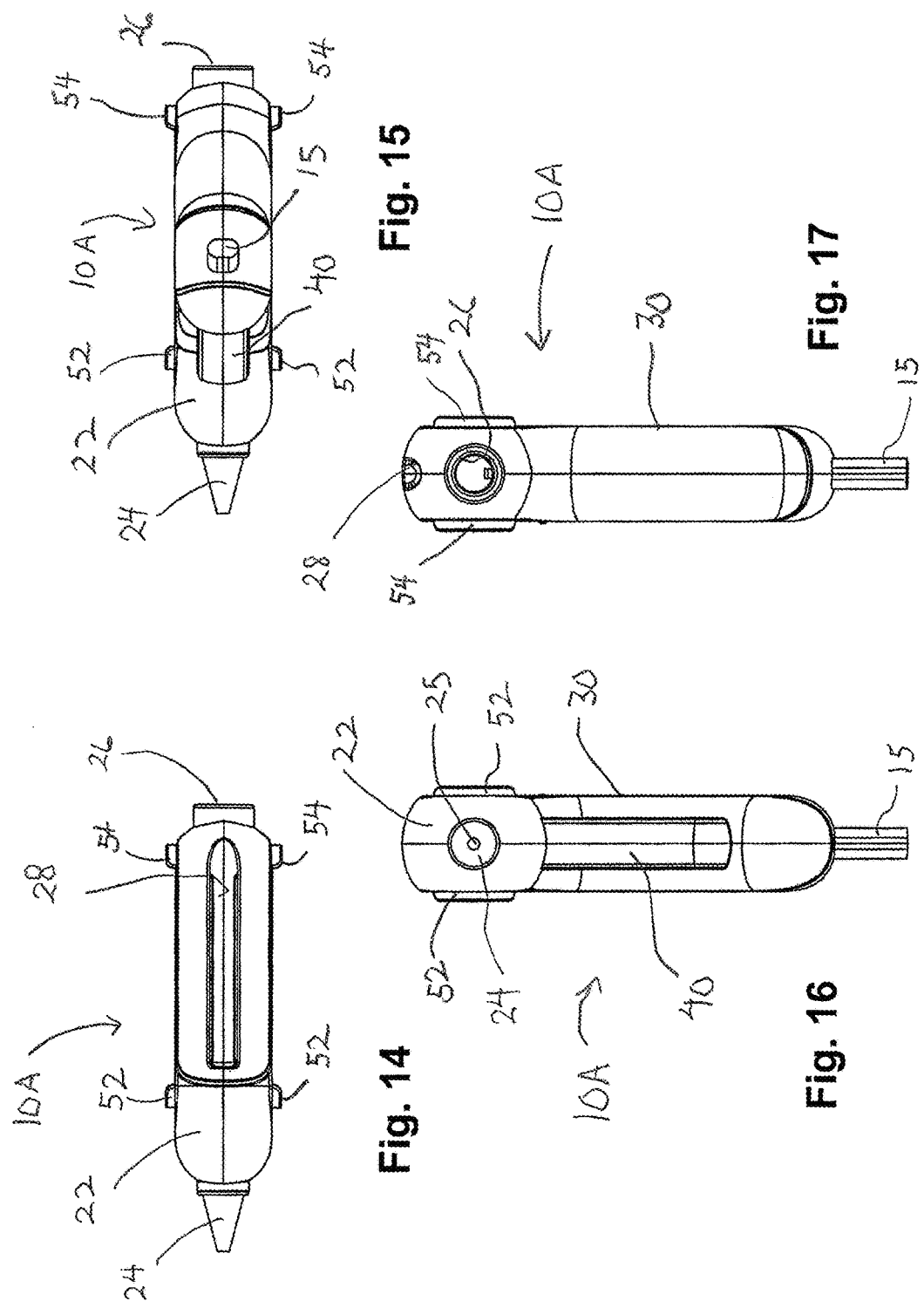

GLUE GUN

BACKGROUND

This disclosure relates generally to a glue gun for crafts and other light duty applications. More particularly, this disclosure relates to a glue gun having a heater which melts a glue stick and dispenses heated glue through a tip.

Numerous glue guns have been commercially marketed for use in crafts and other light gluing applications. The conventional glue guns are generally characterized by having a handle which is disposed at a substantially perpendicular orientation to a main body housing a heater and having a forward nozzle tip. The heater, which is electrically energized, melts a glue stick received in the glue gun body. A trigger assembly is typically employed to advance the melted glue for dispensing through the nozzle tip. The present disclosure provides a number of embodiments which, inter alia, enhance the ease of usage of the glue gun, enhance the performance characteristics of the dispensed glue, and enhance the protection of the gun when it is not in use.

SUMMARY

Briefly stated, a glue gun in a preferred form comprises a housing having a forward dispensing tip and a rear receiver. The housing encloses a glue stick receiving/advancing path and a heater and defines a central axis. A handle extends from the housing at an angle canted to the central axis toward the forward tip. A trigger is manually actuatable to advance a received glue stick along the path. A power cord communicates with the heater. When a glue stick is received in the receiver and advanced along the path and heated by the heater to form molten glue, the trigger is actuatable to dispense molten glue through the tip.

The glue gun tip preferably comprises a non-stick color changing insulated structure. The housing has a top generally opposite the handle. The top defines a recess dimensioned to receive and retain a glue stick. In some embodiments, the top defines a second recess dimensioned to receive and retain a second glue stick. The housing has opposed sides with protruding structures.

The housing mounts an illuminatable indicator which indicates that the glue gun heater is connected to power and indicates that the glue stick is sufficiently heated for dispensing glue. In one embodiment, the indicator comprises an LED halo. The indicator light may emit a light at a first frequency when the heater is warming up and a second frequency when the heater retains a glue dispensing temperature. In one embodiment, the glue gun indicator emits light at three frequencies in response to the temperature of the heater. A control switch selects a low temperature or a full temperature for the heater.

The housing preferably mounts a pivotal stand which is projectable to support the gun in an upright position. The stand has a bifurcated leg configuration which is retractable. In one embodiment, the handle is positionable at a plurality of angles relative to the central axis.

In one embodiment, an indexing mechanism for fixing a plurality of stable anchor positions in the handle is provided. A rotatable dosage guide adjusts the effective advance of a glue stick when the trigger is actuated.

A glue gun comprises a housing having a forward dispensing tip and a rear receiver and encloses a glue stick receiving/advancing path defining a central axis and a heater. A handle extends from the housing at an angle canted to the central axis toward the forward tip. A trigger is manually axially actuatable to sequentially advance a received glue stick along the path. When a glue stick is received in the receiver and the glue stick is heated by the heater to form molten glue, the trigger is actuatable to dispense molten glue through the tip.

The tip comprises a nozzle-like cover with a plurality of angularly spaced flutes. The housing has a top generally opposite the handle. The top defines a recess dimensioned to receive and retain a glue stick. An illuminatable indicator indicates that the glue gun heater is connected to power and indicates that the glue stick is sufficiently heated for dispensing glue.

The indicator emits light at a first frequency when the heater is warming up and at a second frequency when the heater attains a glue dispensing temperature. A user operatable control switch selects a low temperature or a full temperature for the heater. A power cord extends from a portion of the handle and communicates with the heater.

In one embodiment, a glue gun comprises a housing having a forward dispensing tip and a rear receiver and enclosing a glue stick receiving/advancing path defining a central axis and a heater. A handle extends from the housing at an angle canted to the central axis toward the forward tip. A trigger is manually actuatable for pivotal movement to sequentially advance a received glue stick along the path. A glue stick is received in the receiver and advanced along the path. The forward portion of the glue stick is heated by the heater to form molten glue. The trigger is actuatable to dispense molten glue through the tip.

The tip preferably comprises a non-stick insulated structure. The housing has a top generally opposite the handle. The top defines a recess structure dimensioned to receive and retain at least one glue stick. The housing also has an illuminatable indicator which indicates that the glue gun heater is connected to power and that the glue stick is sufficiently heated for dispensing glue. An optional control switch selects a low temperature or a full temperature for the heater. The glue gun also has an on/off switch for the heater and comprises a power cord communicating with the heater.

BRIEF DESCRIPTION OF THE DRAWINGS

FIG. 6 is an annotated front side view of the glue gun of FIG. 3 and further illustrating an extended wire stand with the glue gun resting on a flat surface;

FIG. 7 is a top plan view of the glue gun of FIG. 3;

FIG. 8 is an annotated enlarged fragmentary front side view, illustrating indicator features for the glue gun of FIG. 3;

FIG. 9 is a schematic view, illustrating various positions for the adjustable handle embodiment of FIG. 5;

FIG. 10 is a side front elevational view of the glue gun of FIG. 5 with an extended wire stand and resting on a flat surface;

FIG. 11 is an annotated enlarged fragmentary front side view, illustrating various indicator features for the glue gun of FIG. 5;

FIG. 14 is a top plan view of the glue gun of FIG. 12;

FIG. 15 is a bottom plan view of the glue gun of FIG. 12;

FIG. 16 is a left side view of the glue gun of FIG. 12;

FIG. 17 is a right side view of the glue gun of FIG. 12;

DETAILED DESCRIPTION

With reference to the drawings wherein like numerals represent like parts throughout the several figures, various models of glue guns are designated by the numeral 10 followed by a letter to distinguish the various models. FIGS. 1-5 show various glue guns 10A, 10B, 10C, 10D and 10E, respectively. The glue guns 10 are adapted to heat a glue stick 12 until it reaches a dispensing temperature and to mechanically dispense the molten glue through a tip for craft-type activities. As will be described below, each of the glue gun models connects via an electrical power cord 15 which internally communicates with a heater and various externally illuminated signals for indicating the heating and operating status of the glue gun.

Figure 12:
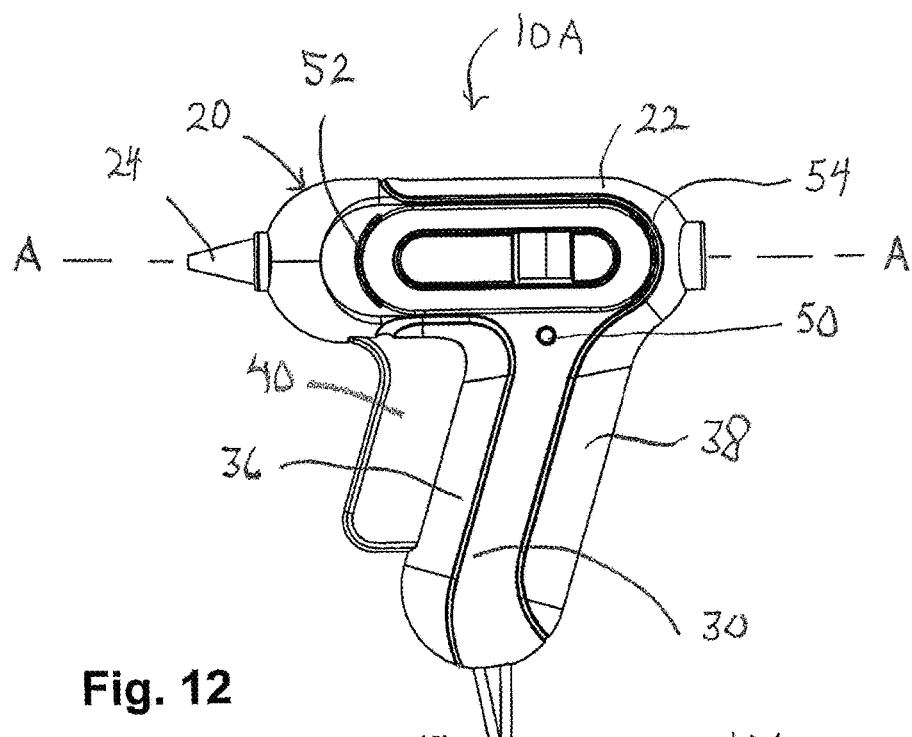
FIG. 12 is an enlarged front elevational view of the glue gun of FIG. 1 and a partially illustrated connected cord and further illustrating a central axis A.
Figure 13:
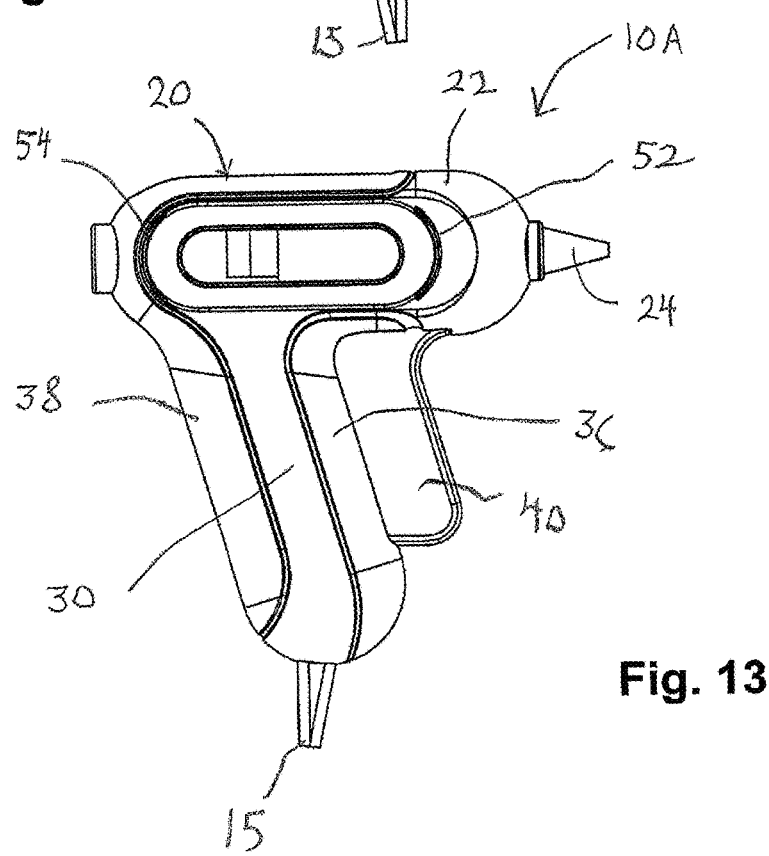
FIG. 13 is an opposite side view of the glue gun of FIG. 12.
Figure 18:
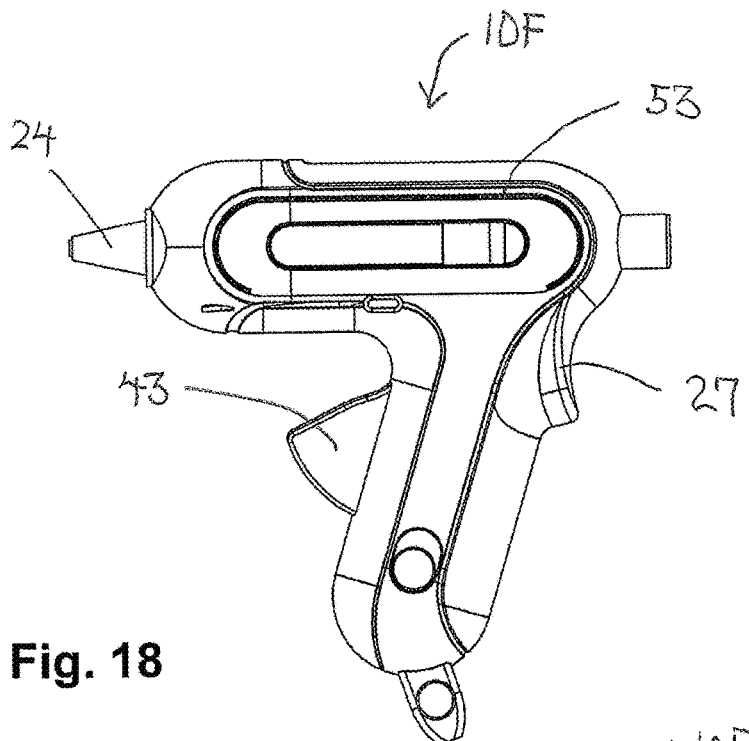
FIG. 18 is a front elevational view of another embodiment of a glue gun together with a cord plug connector.
Figure 19:
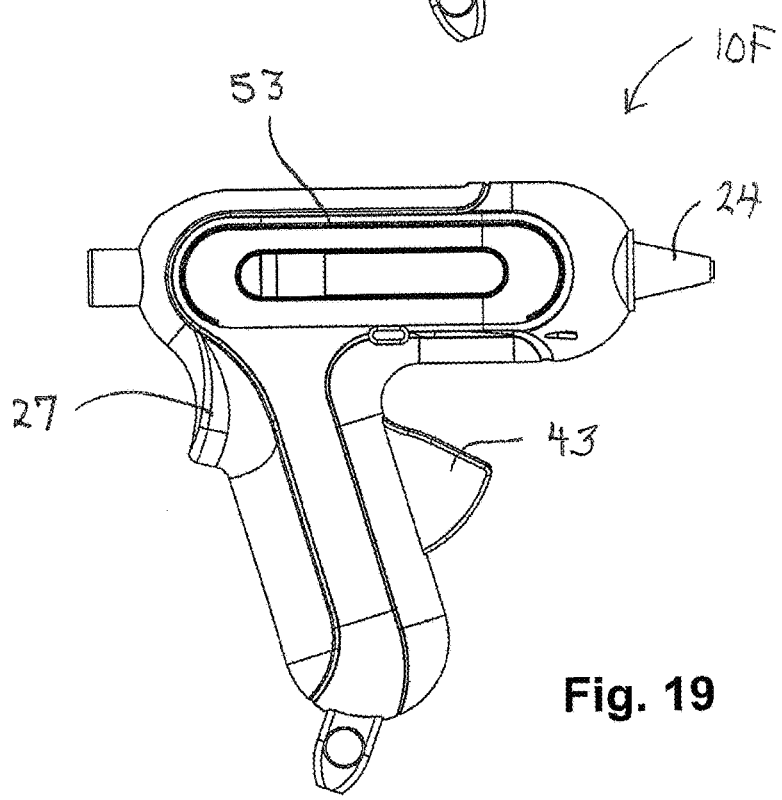
FIG. 19 is an opposite side view of the glue gun and connector of FIG. 18.
Figure 20:
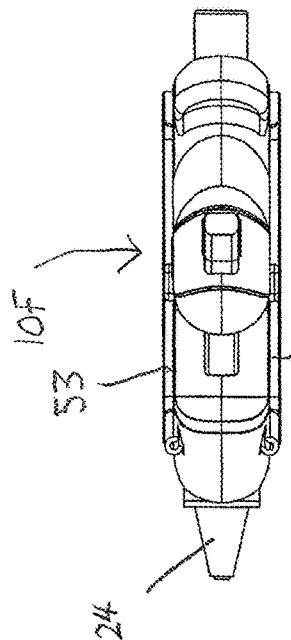
FIG. 20 is a top plan view of the glue gun and connector of FIG. 18.
Figure 21:
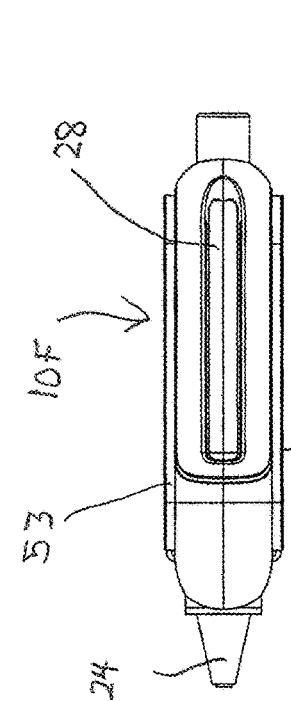
FIG. 21 is a bottom plan view of the glue gun and connector of FIG. 18.
Figure 22:
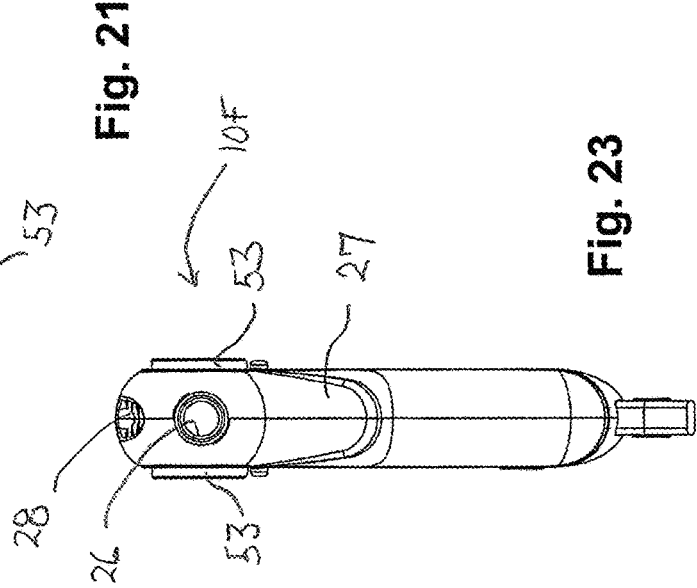
FIG. 22 is a left side view of the glue gun and connector of FIG. 18.
Figure 23:
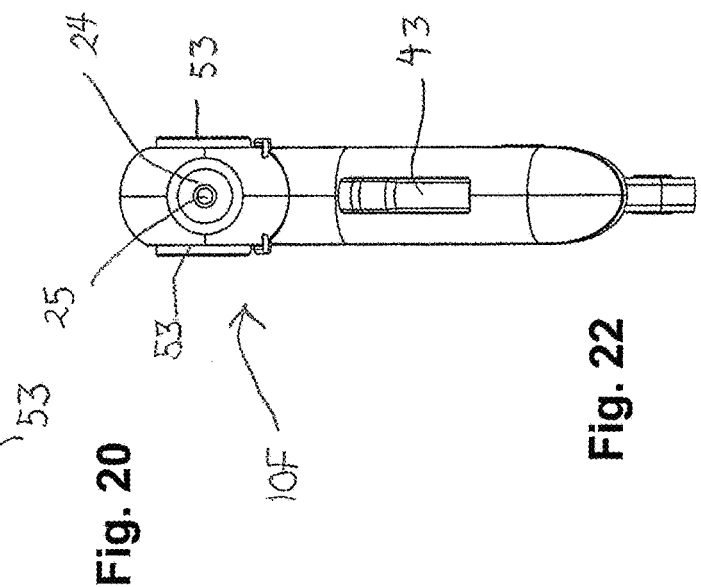
FIG. 23 is a right side view of the glue gun and connector of FIG. 18.
Figure 24:
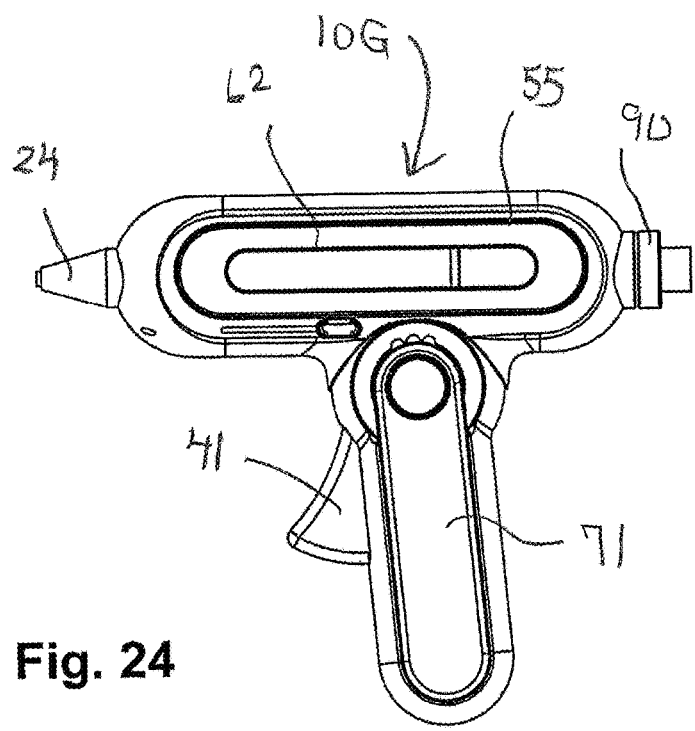
FIG. 24 is a front elevational view another embodiment of a glue gun with an adjustable handle.
Figure 25:
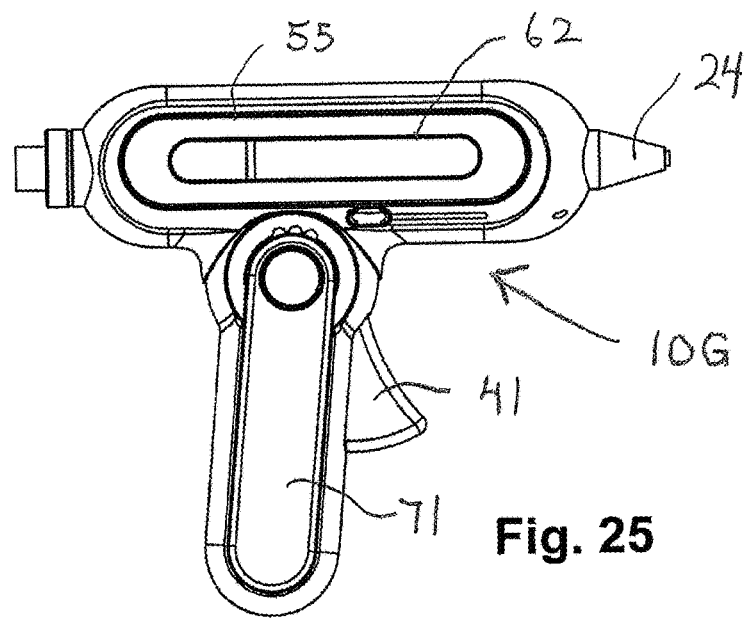
FIG. 25 is an opposite side view of the glue gun of FIG. 24.
Figure 26:
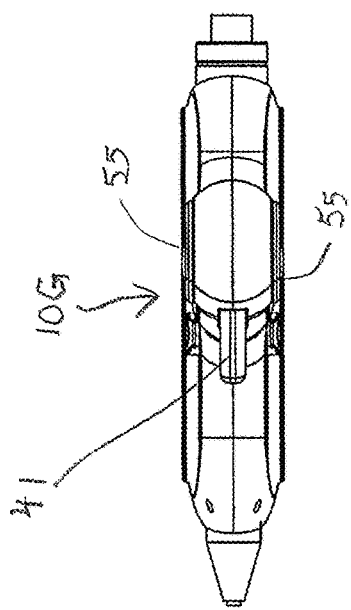
FIG. 26 is a top plan view of the glue gun of FIG. 24.
Figure 27:
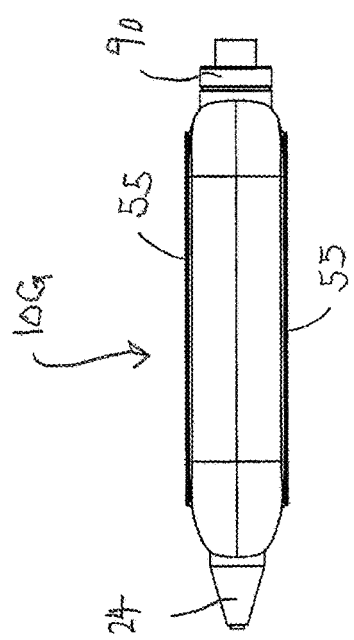
FIG. 27 is a bottom plan view of the glue gun of FIG. 24.
Figure 28:
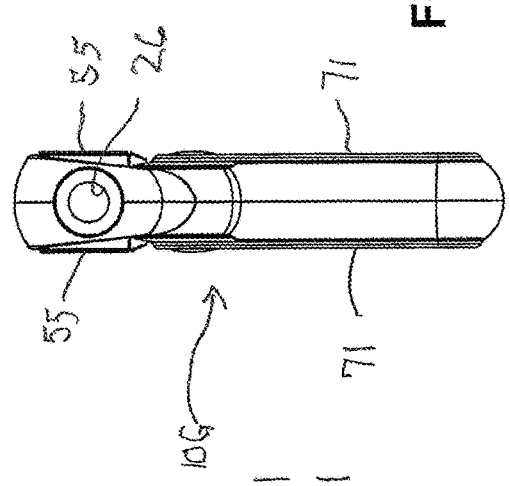
FIG. 28 is a left side view of the glue gun of FIG. 24.
Figure 29:
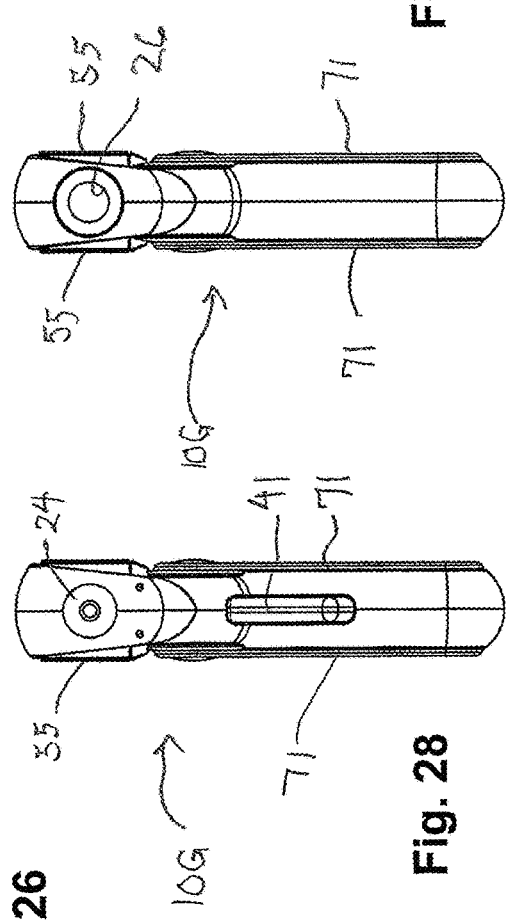
FIG. 29 is a right side view of the glue gun of FIG. 24.
Figure 30:
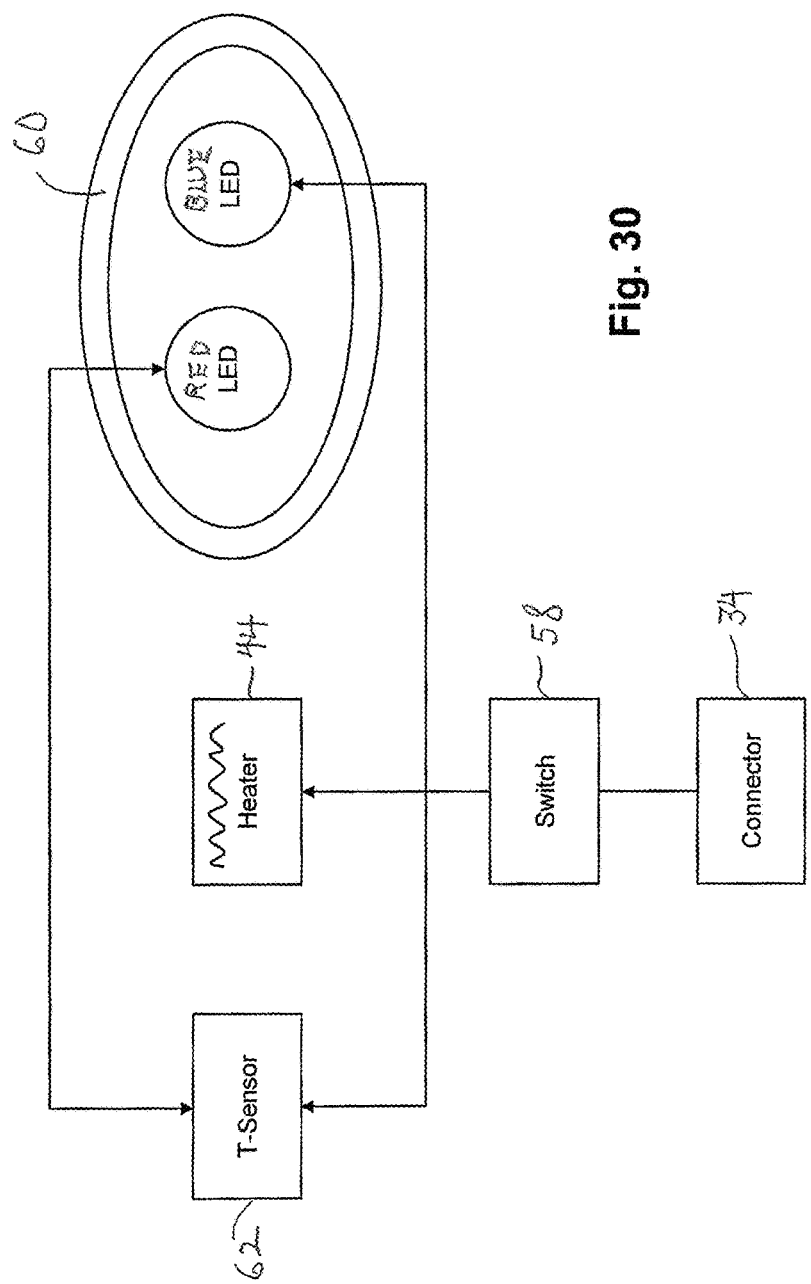
FIG. 30 is a schematic diagram for the glue gun of FIG. 3.
Figure 31:
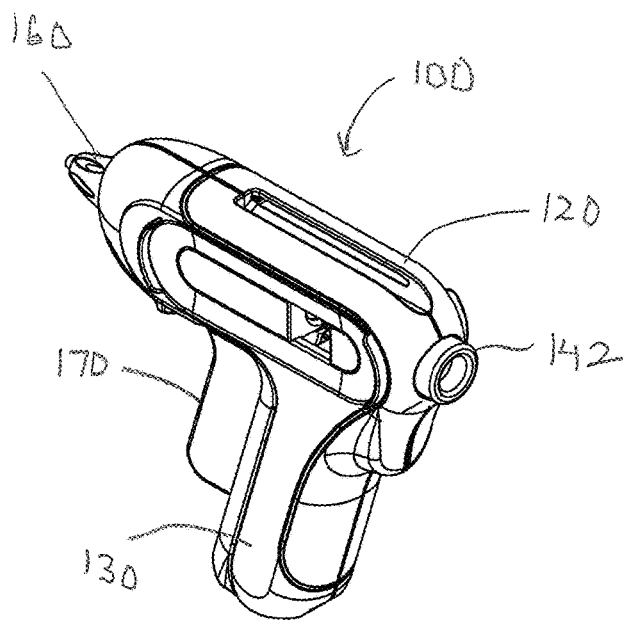
FIG. 31 is a perspective view of a representative glue gun.
Figure 32:
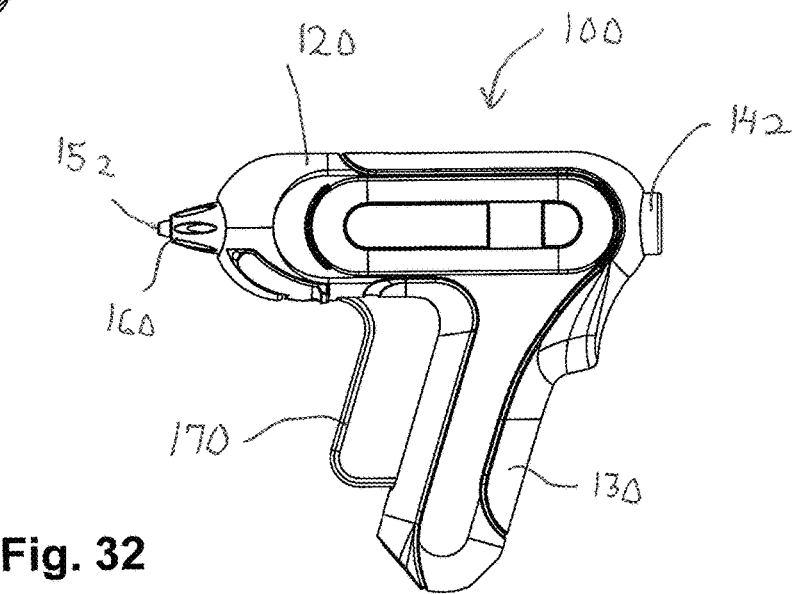
FIG. 32 is a side elevational view of the glue gun of FIG. 31.
Figures 33, 34:
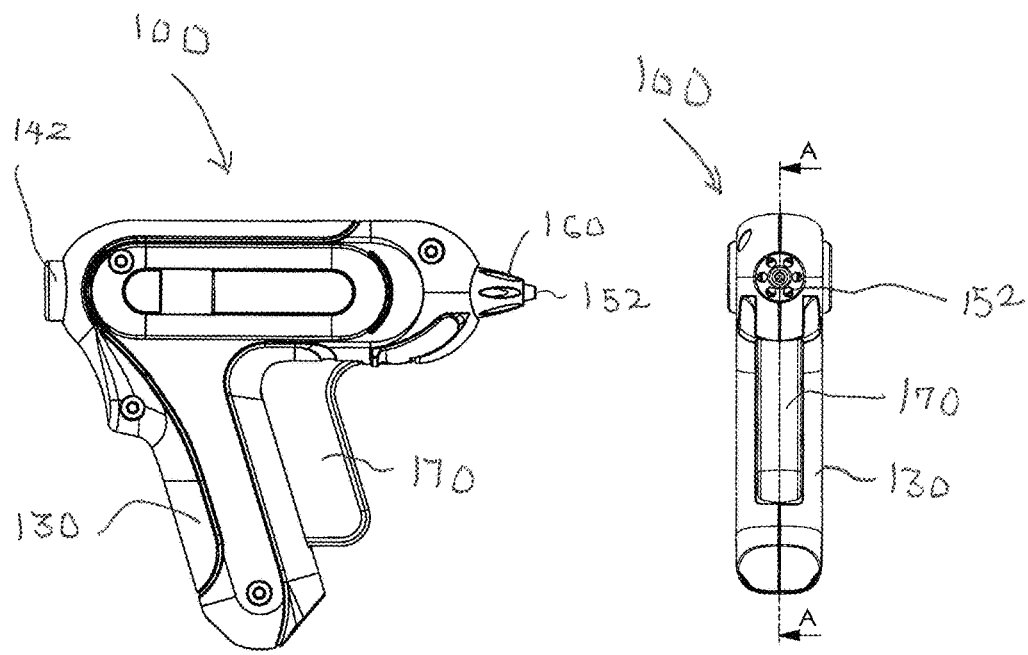
FIG. 33 is an opposite side view of the glue gun of FIG. 32.
FIG. 34 is a front elevational view of the glue gun of FIG. 31.
Figure 35:
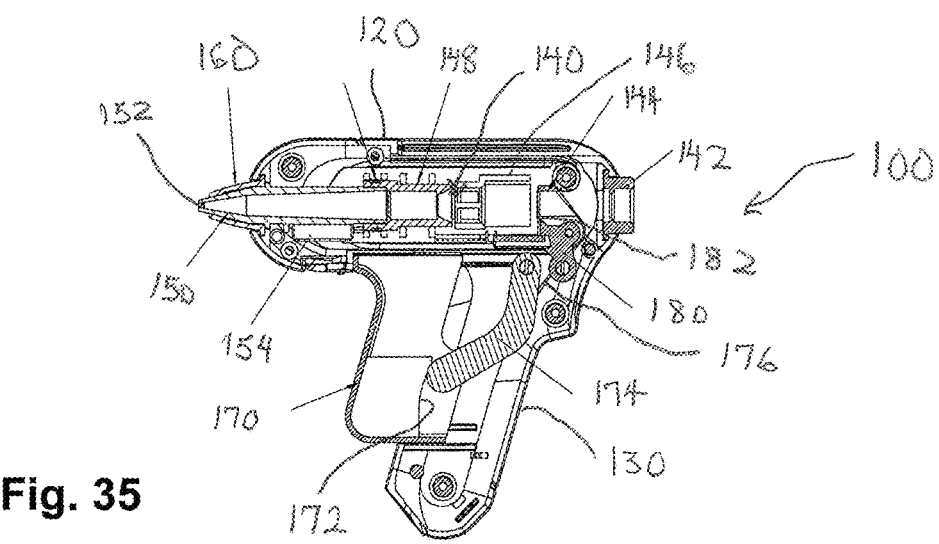
FIG. 35 is a central sectional view of the glue gun of FIG. 34 taken along the line A-A thereof.
Figure 36:
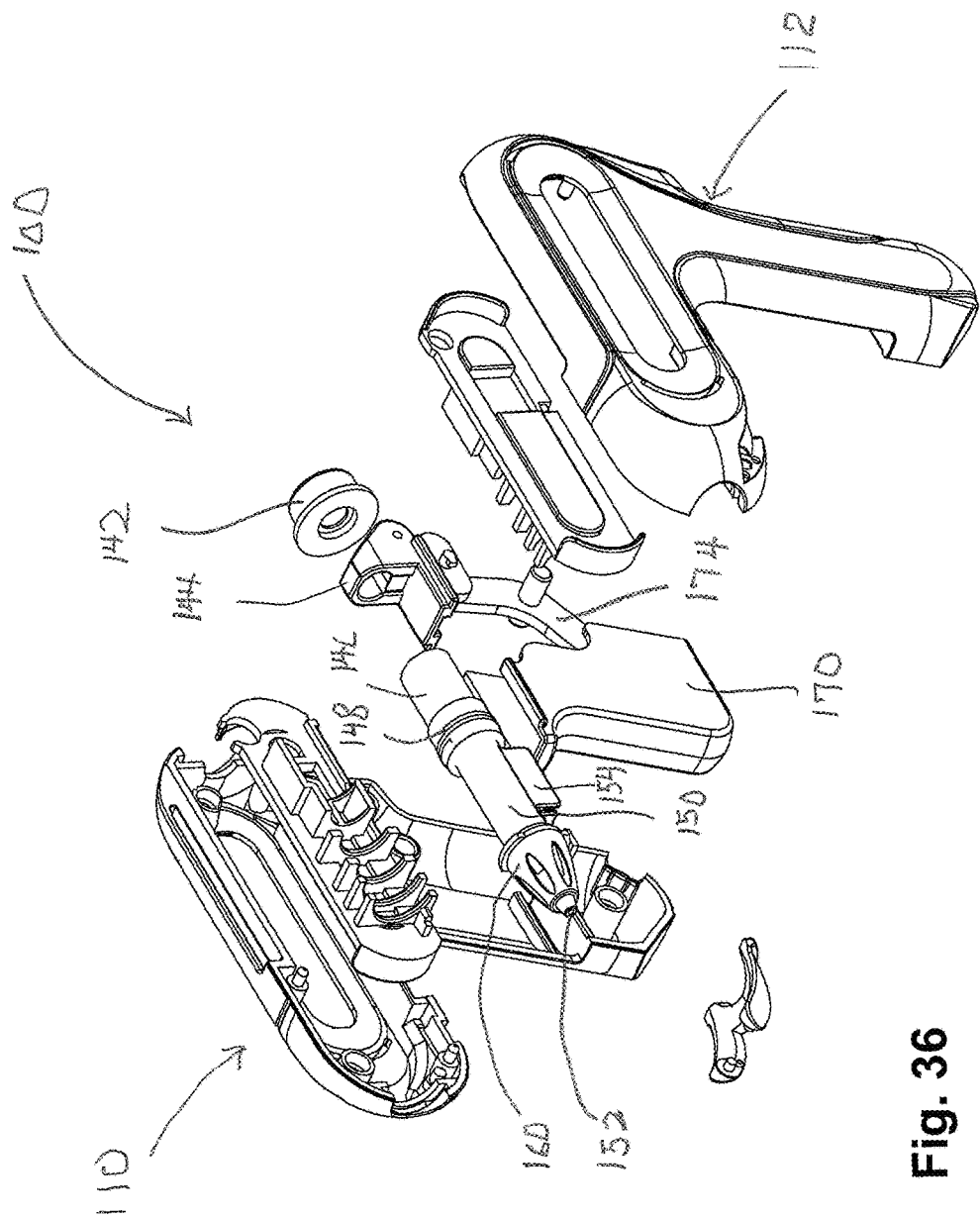
FIG. 36 is an exploded view of the glue gun of FIG. 31.
Figure 37:
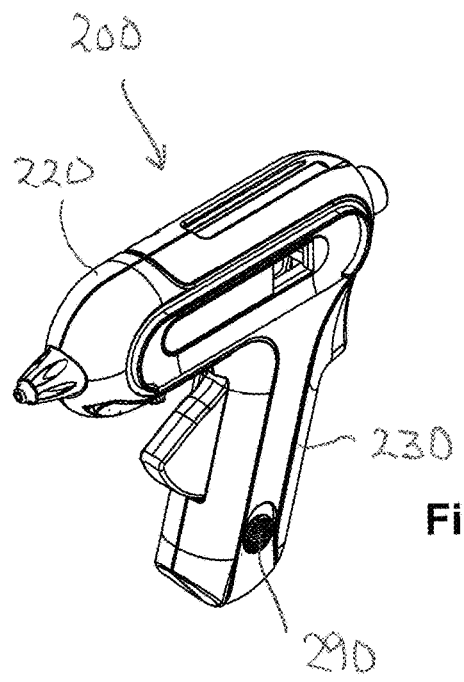
FIG. 37 is a perspective view of another representative glue gun.
Figure 38:
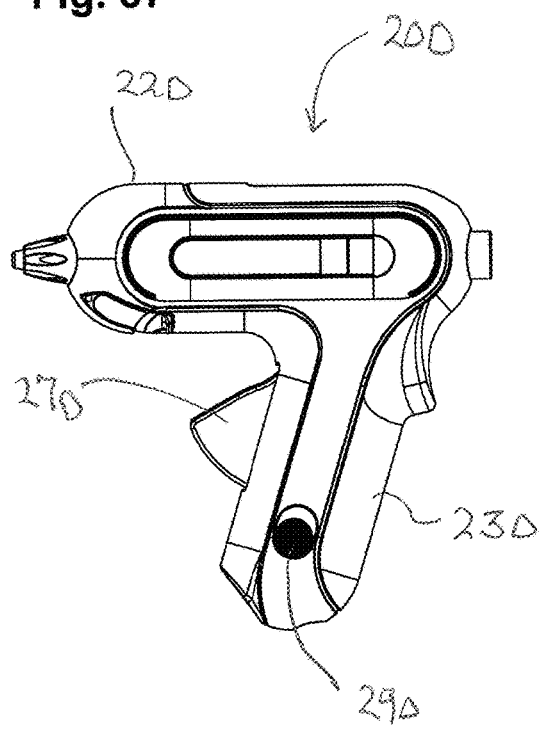
FIG. 38 is a side elevational view of the glue gun of FIG. 37.
Figure 39:
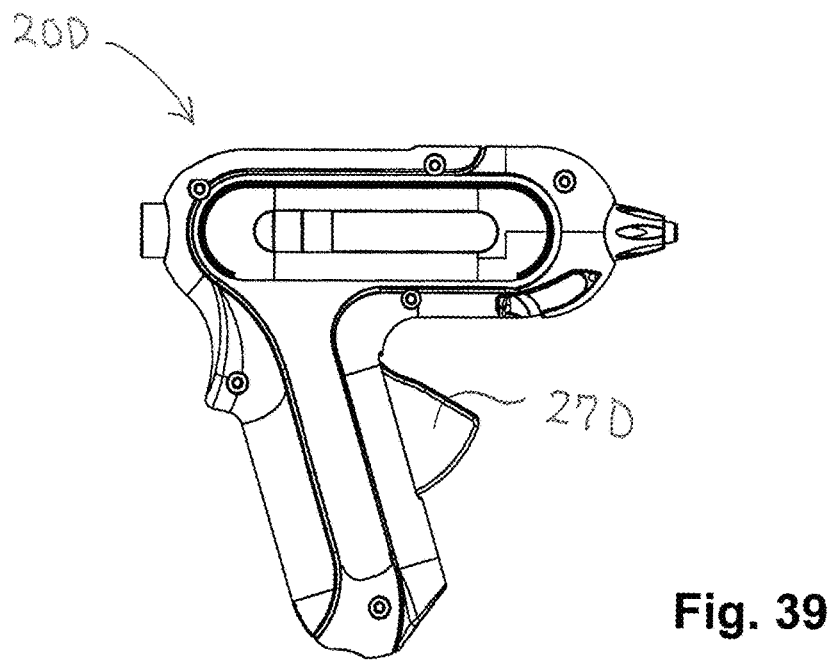
FIG. 39 is an opposite side elevational view of the glue gun of FIG. 38.
Figure 40:
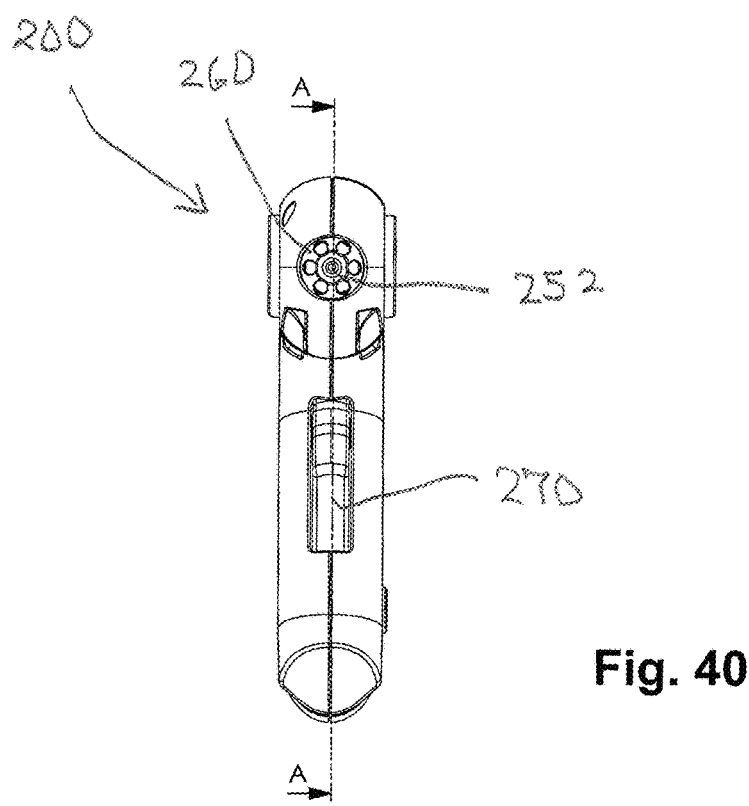
FIG. 40 is an enlarged front elevational view of the glue gun of FIG. 37.
Figure 41:
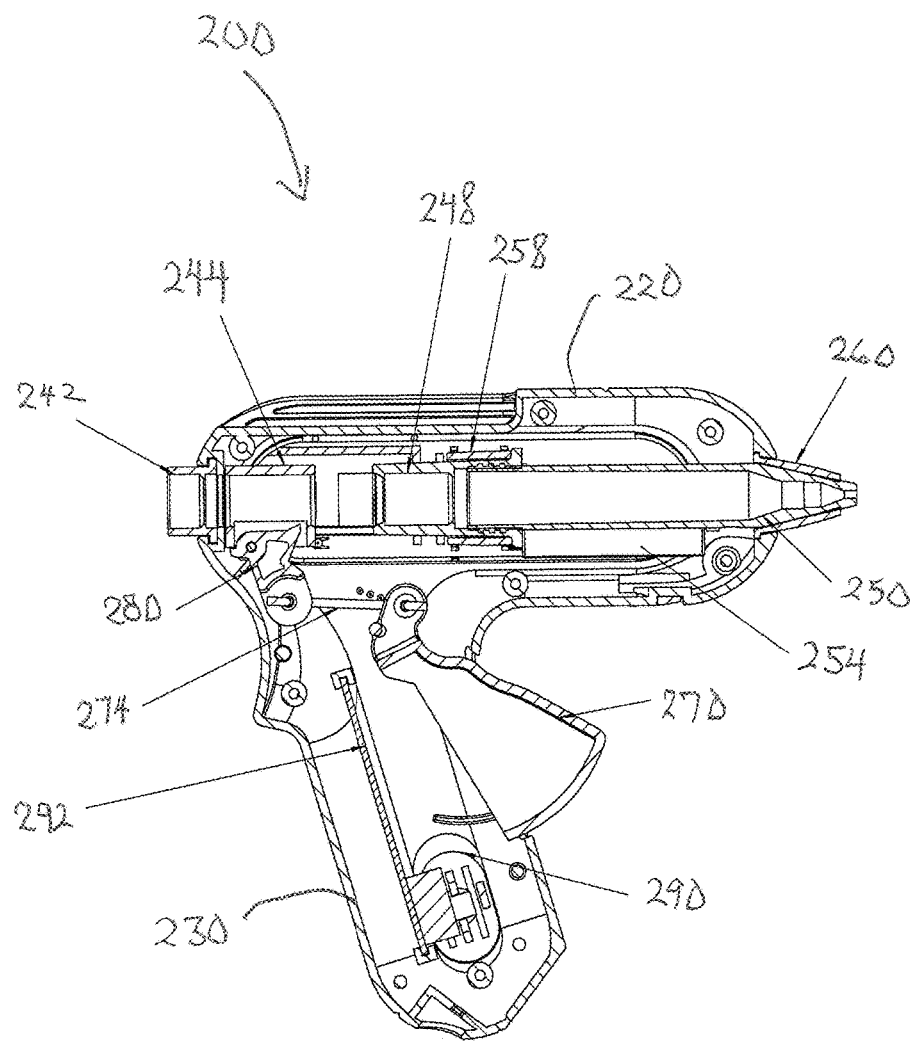
FIG. 41 is an enlarged central sectional view of the glue gun of FIG. 40 taken along the line A-A thereof.
Figure 42:
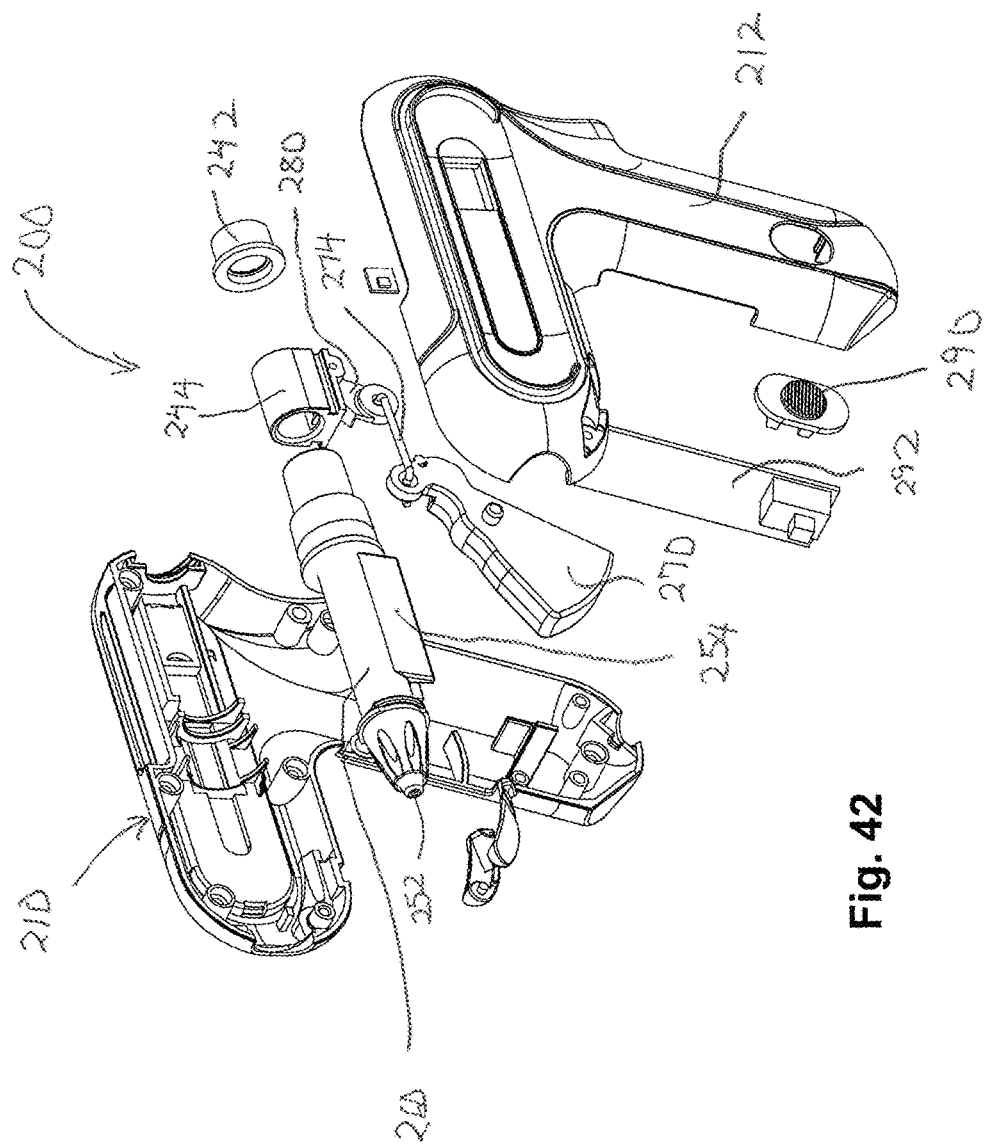
FIG. 42 is an exploded view of the glue gun of FIG. 37.
Figure 43A:
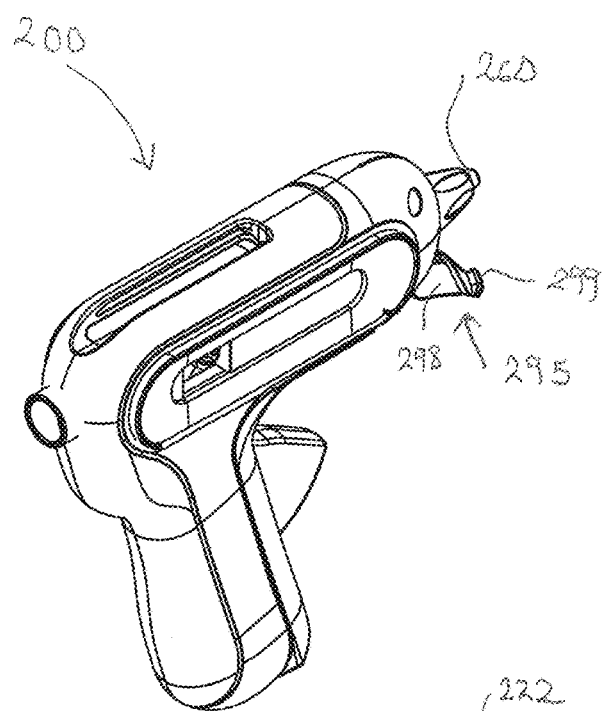
FIGS. 43A-43D are respectively a perspective view, a side elevational view, a bottom plan view and a front elevational view of the glue gun of FIG. 37 with a stand being disposed in an extended functional position.
Figure 43B:
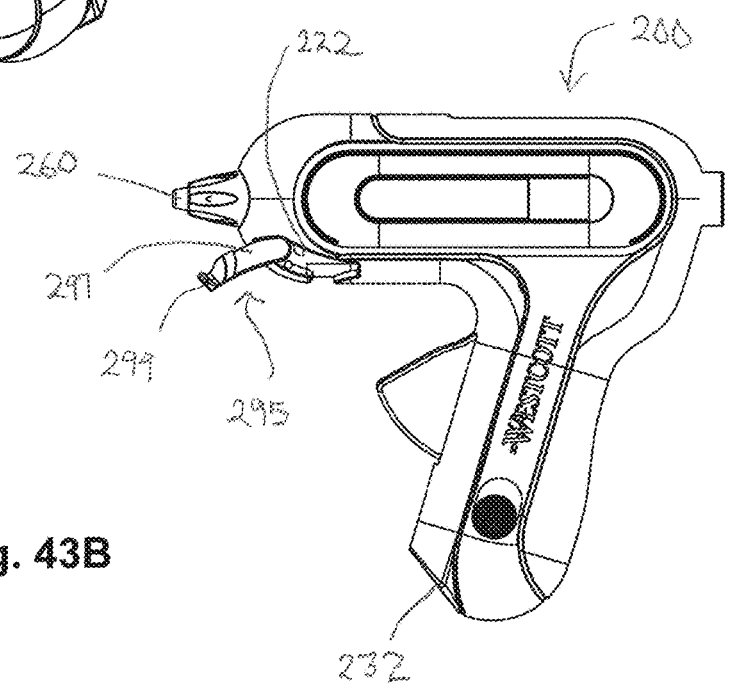
Figure 43C:
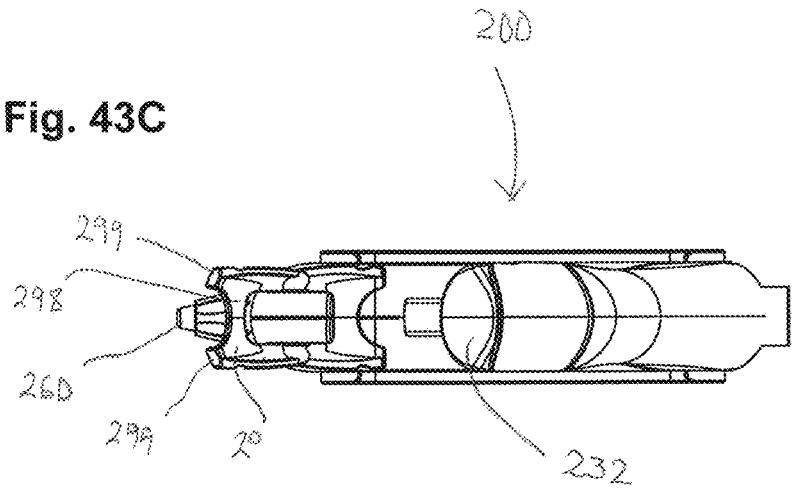
Figure 43D:
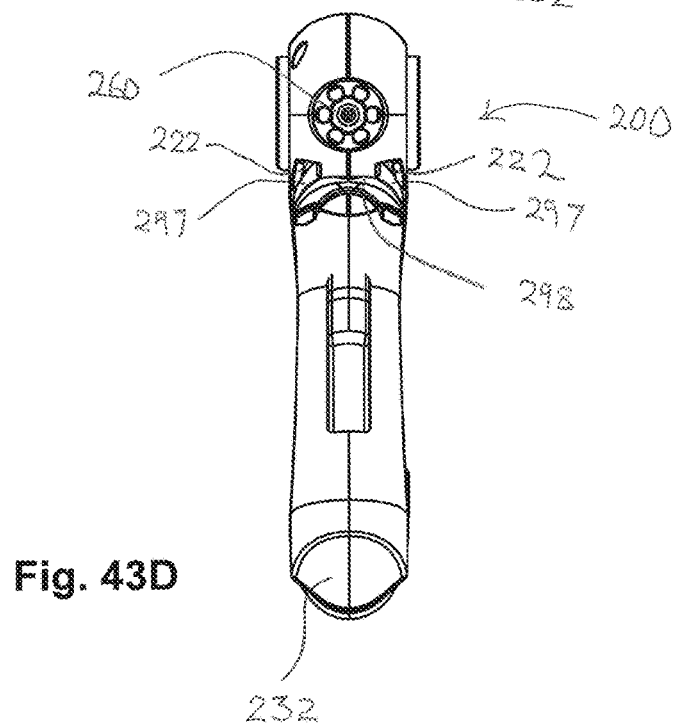

With reference to FIGS. 1 and 12-17, glue gun 10A comprises a main body 20 formed of heavy duty plastic. The main body 20 forms an upper contoured housing 22 defining a central longitudinal axis A (FIG. 12). The housing 22 mounts a forward nozzle tip 24 communicating with a channel and a rear positioned glue stick input opening 26. The top portion of the body defines a recess 28 for receiving an extra glue stick 12.

A handle 30 integrally projects from the underside of the housing 22 and is canted forwardly at an angle to a central longitudinal axis A of the housing at an acute angle. The angle is preferably approximately 70°. A lower rear portion of the handle mounts a connector 34 for receiving the cord 15. Preferably, the cord 15 is fixedly mounted to the lower portion or the handle or to other suitable glue gun locations. The cord 15 plugs into a household outlet (not illustrated). Alternatively, the connector 34 is configured to audibly snap or make a clicking sound when the cord is fully received in the connector.

The handle 30 further comprises forward and rearward textured plastic grip areas 36 and 38, respectively, which integrally extend upwardly in contoured fashion into the exterior sides of the housing 22.

A depressible trigger 40 is disposed at the upper forward portion of the handle. The trigger 40 is manually depressible for mechanically advancing the glue stick 12 and dispensing molten glue through the nozzle tip 24. The nozzle tip 24 is a generally conical structure with a central opening 25 and has an insulated non-stick surface.

The frontal side of the gun 10A includes an LED light 50 generally disposed at the interface between the handle 30 and the housing 22. LED light 50 emits a light at a first frequency or color to indicate that the heater is on and to emit a red light when the heater has attained a temperature wherein the gun is ready for dispensing glue. Glue gun 10A preferably accepts a 5/16 inch glue stick 12 and has a 20 watt heater. The sides of the housing include arcuate opposed raised shoulders 52 and 54 which project from the sides. The shoulders 52 and 54 provide a structure so that the gun can be protectively placed on its side when not in use.

Figures 1, 2, 3, 4, 5:
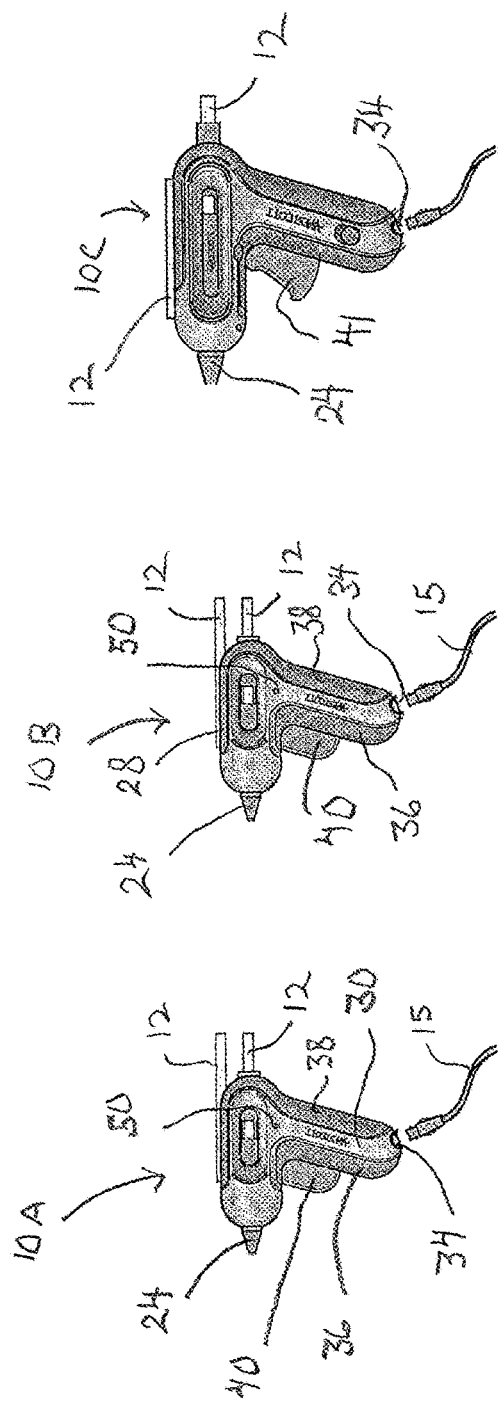
FIGS. 1-5 are front side elevational views of five embodiments of a glue gun together with glue sticks, partially illustrated, and an associated power cord, partially illustrated.

With reference to FIG. 2, glue gun 10B is substantially identical to glue gun 10A, except that its heater is rated for five or ten watts and is particularly adapted to melt lower temperature glue sticks. This model also preferably accepts 5/16 inch glue sticks and, of course, provides a top recess 28 to closely receive and retain a reserve glue stick 12 for subsequent use.

With reference to FIGS. 3, 6-8 and 30, glue gun 10C has substantially the same properties as glue guns 10A and 10B, except that it is adapted to operate at 40 watts and accepts a 7/16 inch glue stick. Glue gun 10C has a heater 44 adapted to operate at a single high temperature. In one embodiment, the top of the gun has a pair of recesses 29 which are adapted to fully closely receive and secure two glue sticks 12, as best illustrated in FIG. 7. For many of the embodiments described below the glue gun has an upper recess for receiving only a single glue stick. The trigger 41 has a quasi-sector shape and a generally pivotal displacement upon actuation.

The glue gun 10C includes a slidable switch 58 to selectively turn on the glue gun. The frontal side of the glue gun 10C includes a glowing LED halo 60 which indicates that the power is on, and also indicates, when warranted, that the gun is ready to use. With reference to FIG. 8, a blue illumination indicates that the glue gun 10C is in the process of heating up, and a red illumination indicates that the glue dispensing temperature has been reached as sensed by a temperature sensor 62. Alternatively, other forms of temperature indicators may be provided.

In addition, the gun 10C includes a slide-out wire stand 80 which may be slidably pulled from the underside of the housing 22. The stand 80 projects outwardly and downwardly to provide a stable support so that the glue gun can be supported in an upright position on two legs 82, as best illustrated in FIG. 6.

With reference to FIG. 4, glue gun 10D includes many of the features previously described for glue guns 10A, 10B and 10C, except that the heater is specifically adapted to operate at 40 watts and to switch operational modes between a full temperature for certain glue stick applications and a low temperature to accommodate a low temperature glue stick. A switch (not illustrated) is provided to select the melting temperature mode. The glue gun 10D includes similar glowing LED halo features of glue gun 10C, except that an additional temperature indicator is included. One indicator indicates that the low temperature has been attained and the second indicator indicates that the high temperature has been attained. Glue gun 10D also includes a wire stand 80, as previously described.

With reference to FIGS. 5 and 9-11, glue gun 10E incorporates many of the features previously described for glue guns 10A-10D, but in one important respect, significantly differs from the latter glue guns. Glue gun 10E includes a positionable handle 70 which may be adjustable to a variety of angles as opposed to the fixed angle configuration of the guns 10A-10D. A spring loaded pin or pawl is received in a selected detent of angularly spaced detents 72, and buttons 74 at opposite sides of the handle 70 are inwardly pushed to release the fixed position and pivotally move the handle to selectively fix the angle of the handle 60. The handle can be adjusted to a wide range of angles as required for a given task. The handle 70 thus rotates for a better ergonomic grip depending on the application of the gun and the project.

With reference to FIG. 11, a glowing LED halo 62 has three distinct illuminations. A blue light illuminates when the heater is in the process of heating up, a yellow light indicates that a low heat dispensing temperature is reached and a red light illuminates when a high dispensing temperature is reached. The handle 70 includes a readily accessible switch 76 and a plug 78 which connects with a power cord 15.

The glue gun 10E also optionally includes the wire stand 80 which can be slidably pulled out from the underside of the housing, as illustrated in FIG. 10.

In addition, at the rear of the housing 22E is a rotating dosage gauge 90 which limits the throw of the trigger advance. The dispensing dosage 90 may be adjusted by rotating the gauge and thus adjusting for the amount of the glue dispensed or advanced on each depression or activation of the trigger 41

With reference to FIGS. 18-23, glue gun 1OF has an ergonomically positioned and contoured grip and trigger assembly comprising a trigger 43 and an upper rear contoured area 27 which ergonomically accommodates the hand when the glue gun is gripped. The projecting support structures 53 at the front and opposite sides have the form of a truncated oval.

Glue gun 10G illustrated in FIGS. 24-29 differs from glue gun 10E primarily in terms of the configuration of the handle 71 which does not have the ON/OFF switch or the cord connector. The projecting supports 55 at the front and opposite sides have the form of an oval.

It will be appreciated that the glue guns 10A-10E provide a unique handle inclination for the glue guns 10A-10D which are canted at a forward acute angle disposition and for glue gun 10E which is adjustable to a wide variety of angular positions. In addition, the non-stick glue nozzle tip 24 provides for ease of operation and maintenance. The recesses 28, 29 at the top of the gun provide a convenient and accessible storage for an extra glue stick. In addition, various light indicators 50, 60 and 62 are provided to indicate the status of the heater and the condition for dispensing. The glue guns also include various protective features, such as the projecting shoulders 52, 53, 54, and 55 and the wire stands 80 so that the glue gun may be effectively positioned when not in use.

With reference to FIGS. 31-36, glue gun 100 is similar in form and function to glue guns 10A and 10B and includes a pair of shells 110 and 112 which cooperate to form the principal exterior body including the housing 120 and the handle 130 of the glue gun. The glue gun has a glue stick feeding path 140 which extends from a rear receiver 142 through a collar 144 and chute 146 to a sleeve 148. A heater body 150 converges to a nozzle-like opening 152 which is surrounded by a cone-like nozzle 160 at the forward end of the glue gun. The nozzle may have a plurality of angularly spaced flutes 162. It will be appreciated that the path of the glue stick through the glue gun until it progressively becomes molten traverses through the heater body 150 and ultimately the opening 152 of the nozzle for dispensing. A PTC heating element 154 is disposed in thermal communication with the heater body 150.

A glue stick feed assembly includes a centrally located trigger button 170 which is biased forwardly and is manually displaceable rearwardly in a generally axial displacement. The trigger button 170 has an inward contoured cam 172 which is engaged by a pivotal linkage 174. A spring 176 biases against the linkage 174 and urges the trigger button 170 to a forward position.

A glue stick feeder 180 responsive to linkage 174 includes a spike 182 which engages the underside of the glue stick and forces the glue stick forwardly upon depression of the trigger button 170. The glue stick is thus advanced by intermittently pulling the trigger to generate a series of sequential advances as the glue stick feeder 180 sequentially engages progressive underside portions of the glue stick. It will be appreciated that in a forward portion of the heater body 160, the glue stick is eventually converted to molten glue so that it can be dispersed through the nozzle opening 152 under the feeding force of the trigger.

With reference to FIGS. 37-42, glue gun 200 is generally similar in form and function to glue guns 10C and 10D. Glue gun 200 includes a pair of body portions 210 and 212 which snap together to form the exterior housing 220 and handle 230 and house a glue gun feed path, heating assembly and a feed or advancing mechanism for the glue stick. The glue gun housing 220 encloses the path 240 of the glue stick through the glue gun which traverses the receiver 242 and collar 244 at the rear, and encloses a heater sleeve 248 which surrounds the received glue stick and a sleeve holder 258 which retains the heater sleeve 248 and the heater body 250. The heater body 250 converges to a nozzle which defines a forward opening 252. A PTC heating element 254 thermally communicates with the heater body 250. A silicon nozzle 260 surrounds the forward portion of the heater body 250.

The trigger button 270 is generally pivotally mounted and is spring biased to a non-actuating forward position. The pivotal button 270 connects with a linkage 274 which drives a glue stick feeder 280. The glue stick feeder engages the underside of the glue stick and forces the glue stick forwardly toward the heater body 250 and the dispensing opening 252 of the nozzle. It will be appreciated that as the trigger button is sequentially depressed, the glue stick is intermittently advanced forwardly. At the forward location when the temperature reaches a sufficient temperature, the glue stick changes phases to molten glue which is dispensed through the nozzle under the advancing force of the feeder 280.

A switch knob 290 is disposed at the handle for turning the heating element 254 on and off. In addition, a printed circuit board 292 may be disposed in the handle for providing the circuitry for the heating element and various indicators.

With additional reference to FIGS. 43A-43D, a stand 295 is pivotally mounted at a forward portion of the housing. The stand comprises a pair of legs 297 connected by a bridge 298. The glue gun housing 220 has a pair of recesses 222 which receive legs 297. In a retracted position, the legs 297 are received in the recesses, such as illustrated in FIGS. 37-40. The legs may be manually pivoted in tandem to the position illustrated in FIGS. 43A-43D to provide a stable stand so that the glue gun may stably rest on the handle edge 232 and the distal feet 299 of the stand 295 with the nozzle 260 being spaced from the surface. During usage, the arms 297 are pivoted back into the retracted position so that the glue gun may be used without interference from the stand.

It will also be appreciated that glue gun 100 employs a stand 195 similar to stand 295 which includes legs 197. The stand 195 may also be manually pivoted for extension and usage as a stand in cooperation with handle edge 132. The legs 197 may be pivotally retracted into the body recesses 122 when the glue gun is used to dispense molten glue.

For glue guns 100 and 200, the nozzles change color (preferably from blue to red) when a sufficient temperature has been reached for dispensing molten glue through the nozzle opening. The nozzle 160 or 260, structure and composition is disclosed in co-pending U.S. patent application Ser. No. 15/333,939 filed Oct. 25, 2016, which disclosure is incorporated herein by reference in its entirety. The flutes 162 and 262 allow the temperature-dependent color of the nozzle structure to be visible.

While preferred embodiments of the foregoing glue gun have been set forth for purposes of illustration, the foregoing description should not be deemed a limitation of the invention herein. Accordingly, various modifications, adaptations and alternatives may occur to one skilled in the art without departing from the spirit and the scope of the present invention.

The invention claimed is:

1. A glue gun comprising:
   a housing having a forward dispensing tip and a rear receiver and enclosing a glue stick receiving/advancing path and a heater and defining a central axis, and said housing has a top and said top defines a recess dimensioned to receive and retain a glue stick;
   a handle extending from said housing at a connecting portion at an acute angle forwardly canted to said central axis wherein a distal portion of said handle is forwardly positioned relative to said connecting portion toward said forward tip;
   a trigger manually actuatable to advance a received glue stick along said path; and
   a power cord communicating with said heater,
   so that when said glue stick is received in said rear receiver and advanced along said path and said glue stick is heated by said heater to form molten glue, said trigger is actuatable to dispense molten glue through said tip.

2. The glue gun of claim 1 wherein said tip comprises a non-stick insulated structure.

3. The glue gun of claim 1 wherein said top defines a second recess dimensioned to receive and retain a second glue stick.

4. The glue gun of claim 1 wherein said housing has opposed sides with protruding structures.

5. The glue gun of claim 1 further comprising a power cord connector and wherein said power cord is detachable from said connector.

6. The glue gun of claim 1 wherein said housing mounts an illuminatable indicator which indicates that the glue gun heater is connected to power and that the glue stick is sufficiently heated for dispensing glue.

7. The glue gun of claim 6 wherein said indicator comprises an LED halo.

8. The glue gun of claim 6 wherein said indicator emits light at a first frequency when the heater is warming up and at a second frequency when the heater attains a glue dispensing temperature.

9. The glue gun of claim 6 wherein said glue gun indicator emits light at three frequencies in response to the temperature of said heater.

10. The glue gun of claim 1 further comprising a control switch to select a low temperature or a full temperature for said heater.

11. The glue gun of claim 1 wherein said tip comprises a nozzle with a cover defining a plurality of angularly spaced flutes and said nozzle changes color to indicate that the glue stick is sufficiently heated.

12. A glue gun comprising:
    a housing having a forward dispensing tip and a rear receiver and enclosing a glue stick receiving/advancing path and a heater and defining a central axis, and wherein said housing mounts a pivot stand which is projectable to support said gun in an upright position;
    a handle extending from said housing at a connecting portion at an acute angle forwardly canted to said central axis wherein a distal portion of said handle is forwardly positioned relative to said connecting portion toward said forward tip; and
    a trigger manually actuatable to advance a received glue stick along said path;
    so that when a glue stick is received in said rear receiver and advanced along said path and said glue stick is heated by said heater to form molten glue, said trigger is actuatable to dispense molten glue through said tip.

13. The glue gun of claim 12 wherein said stand has a bifurcated leg configuration.

14. A glue gun comprising:
    a housing having a forward dispensing tip and a rear receiver and enclosing a glue stick receiving/advancing path and a heater and defining a central axis;
    a handle extending from said housing at a connecting portion at an acute angle forwardly canted to said central axis wherein a distal portion of said handle is forwardly positioned relative to said connecting portion toward said forward tip wherein said handle is positionable at a plurality of angles relative to said central axis; and
    a trigger manually actuatable to advance a received glue stick along said path;

so that when a glue stick is received in said receiver and advanced along said path and said glue stick is heated by said heater to form molten glue, said trigger is actuatable to dispense molten glue through said tip.

15. The glue gun of claim 14 further comprising an indexing mechanism which fixes a plurality of stable angular positions of the handle.

16. A glue gun comprising:
a housing having a forward dispensing tip and a rear receiver and enclosing a glue stick receiving/advancing path and a heater and defining a central axis;
a handle extending from said housing at a connecting portion at an acute angle forwardly canted to said central axis wherein a distal portion of said handle is forwardly positioned relative to said connecting portion toward said forward tip;
a trigger manually actuatable to advance a received glue stick along said path and further comprising a rotatable dosage guide which adjusts an effective advance of a glue stick when the trigger is actuated;
so that when a glue stick is received in said rear receiver and advanced along said path and said glue stick is heated by said heater to form molten glue, said trigger is actuatable to dispense molten glue through said tip.

17. The glue gun of claim 16 wherein said housing has a top and said top defines a recess dimensioned to receive and retain a glue stick.

18. A glue gun comprising:
a housing having a forward dispensing tip and a rear receiver which receives a glue stick and enclosing a glue stick receiving/advancing path and a heater and defining a central axis, said dispensing tip having a nozzle and said nozzle changes color to indicate that the glue stick is sufficiently heated;
a handle extending from said housing at an angle canted to said central axis toward said forward tip;
a trigger manually axially actuatable to sequentially advance the glue stick along said path;
so that when said glue stick is received in said path and said glue stick is heated by said heater to form molten glue, said trigger is actuatable to dispense molten glue through said tip.

19. The glue gun of claim 18 wherein said housing has a top and said top defines a recess dimensioned to receive and retain a glue stick.

20. The glue gun of claim 18 further comprising an illuminatable indicator indicates that the glue gun heater is connected to power and indicates that the glue stick is sufficiently heated for dispensing glue.

21. The glue gun of claim 20 wherein said indicator emits light at a first frequency when the heater is warming up and at a second frequency when the heater attains a glue dispensing temperature.

22. The glue gun of claim 18 further comprising a control switch selects a low temperature or a full temperature for said heater.

23. The glue gun of claim 18 further comprising a power cord communicating with said heater.

24. The glue gun of claim 18 wherein the trigger connects via linkage with a glue stick feeder which advances the glue stick toward the tip.

25. A glue gun comprising:
a housing having a forward dispensing tip and a rear receiver and enclosing a glue stick receiving/advancing path and a heater and defining a central axis, said housing having a top, and said top defines a recessed structure dimensioned to retain at least one glue stick;
a handle extending from said housing at an angle canted to said central axis toward said forward tip;
a trigger manually actuatable for pivotal movement to sequentially advance glue stick along said path;
so that when the glue stick is received in said receiver and advanced along said path and said glue stick is heated by said heater to form molten glue, said trigger is actuatable to dispense molten glue through said tip.

26. The glue gun of claim 25 wherein said tip comprises a non-stick insulated structure.

27. The glue gun of claim 25 wherein said housing has an illuminatable indicator which indicates that the glue gun heater is connected to power and to indicate that the glue stick is sufficiently heated for dispensing molten glue.

28. The glue gun of claim 25 further comprising a control switch selects a low temperature or a full temperature for said heater.

29. The glue gun of claim 25 further comprising an on/off switch for said heater.

30. The glue gun of claim 25 further comprising a power cord and communicating with said heater.

31. The glue gun of claim 25 wherein the trigger connects via linkage with a glue stick feeder which advances the glue stick.

* * * * *